US008874918B2

(12) United States Patent
Goria

(10) Patent No.: US 8,874,918 B2
(45) Date of Patent: Oct. 28, 2014

(54) CONDITIONAL ACCESS METHOD AND SYSTEM FOR BROADCAST SERVICES

(75) Inventor: Paolo Goria, Turin (IT)

(73) Assignee: Telecom Italia S.p.A., Milan (IT)

( * ) Notice: Subject to any disclaimer, the term of this patent is extended or adjusted under 35 U.S.C. 154(b) by 1969 days.

(21) Appl. No.: 11/919,336

(22) PCT Filed: Apr. 28, 2005

(86) PCT No.: PCT/EP2005/004562
§ 371 (c)(1),
(2), (4) Date: Oct. 30, 2009

(87) PCT Pub. No.: WO2006/114123
PCT Pub. Date: Nov. 2, 2006

(65) Prior Publication Data
US 2010/0153730 A1   Jun. 17, 2010

(51) Int. Cl.
*H04L 29/06* (2006.01)
*H04N 21/254* (2011.01)
(Continued)

(52) U.S. Cl.
CPC ....... *H04N 21/4182* (2013.01); *H04N 21/2541* (2013.01); *H04N 21/25816* (2013.01); *H04N*
(Continued)

(58) Field of Classification Search
CPC .......................... H04N 7/1675; H04N 21/2541
USPC ............ 713/172, 173, 185; 726/9, 20, 27–29; 725/30
See application file for complete search history.

(56) References Cited

U.S. PATENT DOCUMENTS

2006/0008256 A1 * 1/2006 Khedouri et al. ............. 386/124

FOREIGN PATENT DOCUMENTS

| GB | 2 367 925 A | 4/2002 |
| WO | WO-01/80460 A1 | 10/2001 |

(Continued)

OTHER PUBLICATIONS

M. Kuhn, "The New European Digital Video Broadcast (DVB) Standard," www.cl.cam.ac.uk/~mgk25/dvb.txt, 19 pages, (1996).

(Continued)

*Primary Examiner* — Justin T Darrow
(74) *Attorney, Agent, or Firm* — Finnegan, Henderson, Farabow, Garrett & Dunner, L.L.P.

(57) ABSTRACT

A method for conditionally allowing fruition of broadcast contents, broadcast by a contents broadcaster and received by a user by means of a receiving equipment, includes: performing, locally at the receiving equipment of the user, a first fruition entitlement check based on first fruition entitlement data available locally at the receiving equipment; having the receiving equipment provide to the contents broadcaster the first fruition entitlement data exploiting a return communications channel of the receiving equipment; having the contents broadcaster perform a second fruition entitlement check based on a comparison between the received first fruition entitlement data and second fruition entitlement data available locally to the contents broadcaster; and conditioned on a result of the second check, having the contents broadcaster provide to the receiving equipment, exploiting the return communications channel, a fruition entitlement confirmation notification; at the receiving equipment, conditioning the fruition of the broadcast contents based on the receipt of the fruition entitlement confirmation by the contents broadcaster.

20 Claims, 5 Drawing Sheets

(51) Int. Cl.
*H04N 21/258* (2011.01)
*H04N 21/4623* (2011.01)
*H04N 21/61* (2011.01)
*H04N 21/4385* (2011.01)
*H04N 21/426* (2011.01)
*H04N 21/6334* (2011.01)
*H04N 21/6377* (2011.01)
*H04N 7/173* (2011.01)
*H04N 7/167* (2011.01)
*H04N 21/835* (2011.01)
*H04N 21/418* (2011.01)

(52) U.S. Cl.
CPC 21/4623 (2013.01); *H04N 21/6181* (2013.01); *H04N 21/25833* (2013.01); *H04N 21/43853* (2013.01); *H04N 21/42684* (2013.01); *H04N 21/6334* (2013.01); *H04N 21/6377* (2013.01); *H04N 21/6112* (2013.01); *H04N 7/17309* (2013.01); *H04N 7/1675* (2013.01); *H04N 21/835* (2013.01)

USPC ............... 713/173; 713/172; 713/185; 726/9; 726/20; 726/27

(56) References Cited

FOREIGN PATENT DOCUMENTS

| WO | WO-02/13032 A1 | 2/2002 |
| WO | WO-02/096109 A1 | 11/2002 |
| WO | WO-2005/036854 A1 | 4/2005 |

OTHER PUBLICATIONS

C. Muriel, "What is Digital Satellite Television", Digital TV, A Technical FAQ, Rev. 4.0, www.drakesvision.com/digi4.htm, 2 pages, (2000).

Van Moffaert, A. et al.; "Digital Rights Management: DRM is a key enabler for the future growth of the broadband acess market, and the telecom/networking market in general", Alcatel Telecommunications Review, $2_{nd}$ Quarter, pp. 1-7, (2003).

* cited by examiner (1st of 2)

(2nd of 2)

CONDITIONAL ACCESS METHOD AND SYSTEM FOR BROADCAST SERVICES

CROSS REFERENCE TO RELATED APPLICATION

This application is a national phase application based on PCT/EP2005/004562, filed Apr. 28, 2005, the content of which is incorporated herein by reference.

FIELD OF THE INVENTION

The present invention generally relates to the field of telecommunications, including TeleVision (TV) networks. In particular, the invention concerns audio and/or video broadcast transmission systems in which a conditional access to the broadcast contents is implemented.

BACKGROUND OF THE INVENTION

Most digital audio and/or video broadcasting systems, particularly those of digital nature like digital terrestrial television and digital satellite television, have the capability of broadcasting audio and/or video contents while restricting the access to selected contents on a user-specific basis; to this purpose, so-called "Conditional Access" (CA) systems are exploited, that allow managing the users' access rights to the broadcast contents. Typically, CA systems are exploited to enable fruition of particular contents, like movies or sport matches or like events, in respect of those users who have properly subscribed and paid for them.

Conditionally enabling a user to access specific broadcast contents typically means that the contents (e.g., a video and/or audio stream) are properly encoded, and that, together with the encoded contents, decoding information necessary for the decoding thereof are broadcast. A detailed description of the use of CA systems in Digital Video Broadcasting (DVB) systems is provided in the European Telecommunications Standards Institute (ETSI) Technical Report (ETR) 289 entitled "Digital Video Broadcasting (DVB); Support for use of scrambling and Conditional Access (CA) within digital broadcasting systems".

In order to enjoy the broadcast contents, the user needs a receiver, which can be a separate equipment (usually called "Set Top Box" or, shortly, STB) associated with the TV set located at the generic user's premises, or it can be embedded thereinto.

The receiver receives the encoded contents and the associated decoding information, and is adapted to exploit the latter for decoding the contents so as to make it enjoyable by the user.

Usually, CA systems rely on the provisioning to the subscriber users of a personal smart card, i.e. a typically credit-card size support embedding an integrated-circuit chip with data storage and processing capabilities; in particular, the smart card stores data (e.g., passwords, decryption keys, contents fruition enabling data specifying the contents whose fruition is authorized) to be exploited for enabling the decoding of the broadcast contents. The user inserts the personal smart card into a suitable smart card reader of which the STB needs to be provided; the data stored on the smart card and the decoding information broadcast with the encoded contents are exploited for decoding the contents while they are received. If the correct smart card is not inserted in the STB's reader (or if the smart card is not enabled—for example, the smart card has not been activated, or has been deactivated by the contents broadcaster), the fruition of the broadcast contents is denied, and the STB can not decode the received, encoded video and/or audio broadcast streams. This operation is for example described in the document by M. Kuhn entitled "The New European Digital Video Broadcast (DVB) Standard", published (at the date of filing of the present application) on the Internet at the address www.cl.cam.ac.uk/~mgk25/dvb.txt. The structure, in terms of functional blocks, of a conventional STB is for example described in the document published (at the filing date of the present application) on the Internet at the address www.drakesvision.com/digi4.htm. Schematizing, the STB includes a front-end functional module that receives the signal from the antenna and retrieves the broadcast data (video and/or audio) streams; a decoder functional module, which, in case the received data stream is encoded, decodes it; a back-end functional module, adapting the decoded signal to the format supported by the TV set. The decoder module interacts with a CA system functional module, requesting thereto the authorization and other information necessary for decoding the received streams. The CA system module interacts in turn with the smart card (inserted in the smart card reader of the STB), on which the user's subscription data and the information necessary for the decoding process are stored.

While receiving an encoded data stream, the decoder module periodically requests to the CA system module the authorization to decode and the information necessary for decoding the encoded stream; the CA system module, in turn, requests the above data to the smart card, and provides them to the decoder module; the decoder module then decodes the encoded stream. These actions are performed, for example repeatedly, during the reception of the video and/or audio contents.

A drawback in the process described above resides in the fact that the enablement to the fruition of the encoded video and/or audio contents is entirely performed in the user's receiver, e.g. in the STB, relying on the data stored on the smart card which is assumed to having been provisioned to the subscriber user. In case a fraudulent user succeeds in tampering its own smart card, so to alter the data stored therein, for example to the extent that the contents' fruition is always considered authorized (e.g., irrespective of which content is being received), or in case the data stored on the smart card are extracted therefrom, making available the information necessary for performing the decoding, or even in case the smart card itself is cloned, the encoded broadcast contents would become fully available to the user, without authorization of the content provider, which not only is not in a position to prevent such an unauthorized, fraudulent exploitation of the contents, but it is not even aware of it.

In WO 01/80460 a method for controlling reception of a digital TV transmission is disclosed, in which the decoding key entitling to the decoding of the digital transmission is transmitted to a subscriber user's wireless terminal device, e.g. a mobile station; the decoding key is then transferred to the receiving equipment (set-top box) and the digital transmission received is decoded with the aforementioned decoding key. The use of the wireless terminal device compensates the smart card required for the decoding of the digital transmission.

In WO 02/096109 a broadcasting receiving equipment is also disclosed, including a control section able to generate return data by including return information data among input data and broadcasting data. The broadcasting receiving equipment further includes a mobile communication section for transforming the return data into mobile communication signals in order to transmit the return data to receivers through a mobile communication network. Return data may include a MAC address given to the broadcasting receiving device; an identifying number given to subscribers or the combination thereof, as an identifier; particulars about trouble detected by the control section.

SUMMARY OF THE INVENTION

The Applicant has observed that in the method disclosed in WO 01/80460, the enabling to the fruition of the digital TV transmission takes places exclusively via the wireless terminal device; thus, the receiving equipment, before being in condition to allow the fruition of the broadcast contents, has to wait for the receipt of the decoding key; as a consequence, the user may have to wait some time before being able to view the desired transmission. Moreover, since the decoding key may (usually does) vary in time during a same transmission, the user has to keep the wireless terminal device constantly available to the receiving equipment for receiving the updated decoding keys. Finally, the broadcast technology used for the TV transmission needs to be refined according to the method disclosed in WO 01/80460, since the decoding keys used to enjoy the broadcast contents are exclusively sent via the wireless terminal device.

The Applicant has faced the problem of improving the conventional CA methods and systems.

In particular, the Applicant has faced the problem of how to enable the broadcast contents provider, e.g. a digital TV broadcast network, to more directly manage the authorizations to the fruition of the contents, without entirely entrusting this task to the users' receiver equipment and to the smart card cooperating therewith.

The Applicant has found that the robustness of conventional CA methods and systems can be significantly improved by exploiting, in support thereto, the communications capabilities offered by a return communications channel (shortly, return channel) between the user's receiving equipment and the contents broadcaster.

The notion of return channel associated with, e.g., a digital TV receiver is per-se already known in the art; for example, in the document DVB-A008 dated October 1995 and entitled "Commercial requirements for asymmetric interactive services supporting broadcast to the home with narrowband return channels" there is described how the digital audio and/or video broadcasting standards like the Digital Video Broadcasting (DVB—other broadcasting standards are for example the Digital Audio Broadcasting—DAB—and the Advanced Television Systems Committee—ATSC) encompass the possibility of implementing interactive services such as video on demand, pay per view, home shopping, gaming, exploiting a narrowband, bidirectional return channel, thus allowing the receiving equipment at the user's premises to send/receive data relating to the interactive services received in broadcast.

In particular, the Applicant has found that the return channel can be advantageously exploited for allowing the content broadcaster participating in the management of the authorization to render the broadcast contents enjoyable by a generic user.

According to an aspect of the present invention, a method is provided, for conditionally allowing fruition of broadcast contents, broadcast by a contents broadcaster and received by a user by means of a receiving equipment, comprising:

performing, locally at the receiving equipment of the user, a first fruition entitlement check based on first fruition entitlement data available locally at the receiving equipment, at the receiving equipment, conditioning the fruition of the broadcast contents based on a result of said first fruition entitlement check, characterized by further comprising:

having the receiving equipment provide to the contents broadcaster second fruition entitlement data exploiting a return communications channel of the receiving equipment;

having the contents broadcaster perform a second fruition entitlement check based on a comparison between the received second fruition entitlement data and third fruition entitlement data available locally to the contents broadcaster;

conditioned on a result of the second check, having the contents broadcaster provide to the receiving equipment, exploiting the return communications channel, a fruition entitlement confirmation notification.

According to another aspect of the present invention, receiving equipment is provided, for receiving contents broadcast by a contents broadcaster, comprising a conditional access system adapted to conditionally allow fruition of the broadcast contents based on a first fruition entitlement check performed locally at the receiving equipment exploiting first fruition entitlement data available locally at the receiving equipment, and a communicator module adapted to communications over a return communications channel, characterized by further comprising:

a fruition authorization confirmation manager module cooperating with the communicator module and adapted to send fruition authorization confirmation requests to a predetermined, remote authorization manager exploiting the return communications channel, said fruition authorization confirmation requests including second fruition entitlement data, and to receive, over the return communications channel, of fruition entitlement confirmations by the remote authorization manager.

According to a further aspect of the present invention, a contents broadcasting system is provided, for broadcasting contents over a broadcast channel, said contents being adapted to be conditionally accessible by a user exploiting a receiving equipment, said access to said contents being conditioned by a first fruition entitlement check based on first fruition entitlement data available locally at the receiving equipment, characterized by comprising a fruition authorization verifier adapted to communicate with the receiving equipment over a return communications channel of the receiving equipment, said authorization verifier being further adapted to:

receive from the receiving equipment fruition authorization requests including second contents fruition entitlement data available locally at the receiving equipment;

perform a second fruition entitlement check based on a comparison between the received second fruition entitlement data and third fruition entitlement data available locally to the contents broadcaster; and conditioned on a result of the second check, providing to the receiving equipment, exploiting the return communications channel, a fruition entitlement confirmation notification.

BRIEF DESCRIPTION OF THE DRAWINGS

The features and advantages of the present invention will be made clear by the following detailed description of an embodiment thereof, provided merely by way of non-limitative example, description that will be conducted making reference to the annexed drawings, wherein.

DETAILED DESCRIPTION OF THE PREFERRED EMBODIMENT(S) OF THE INVENTION

Figure 1:
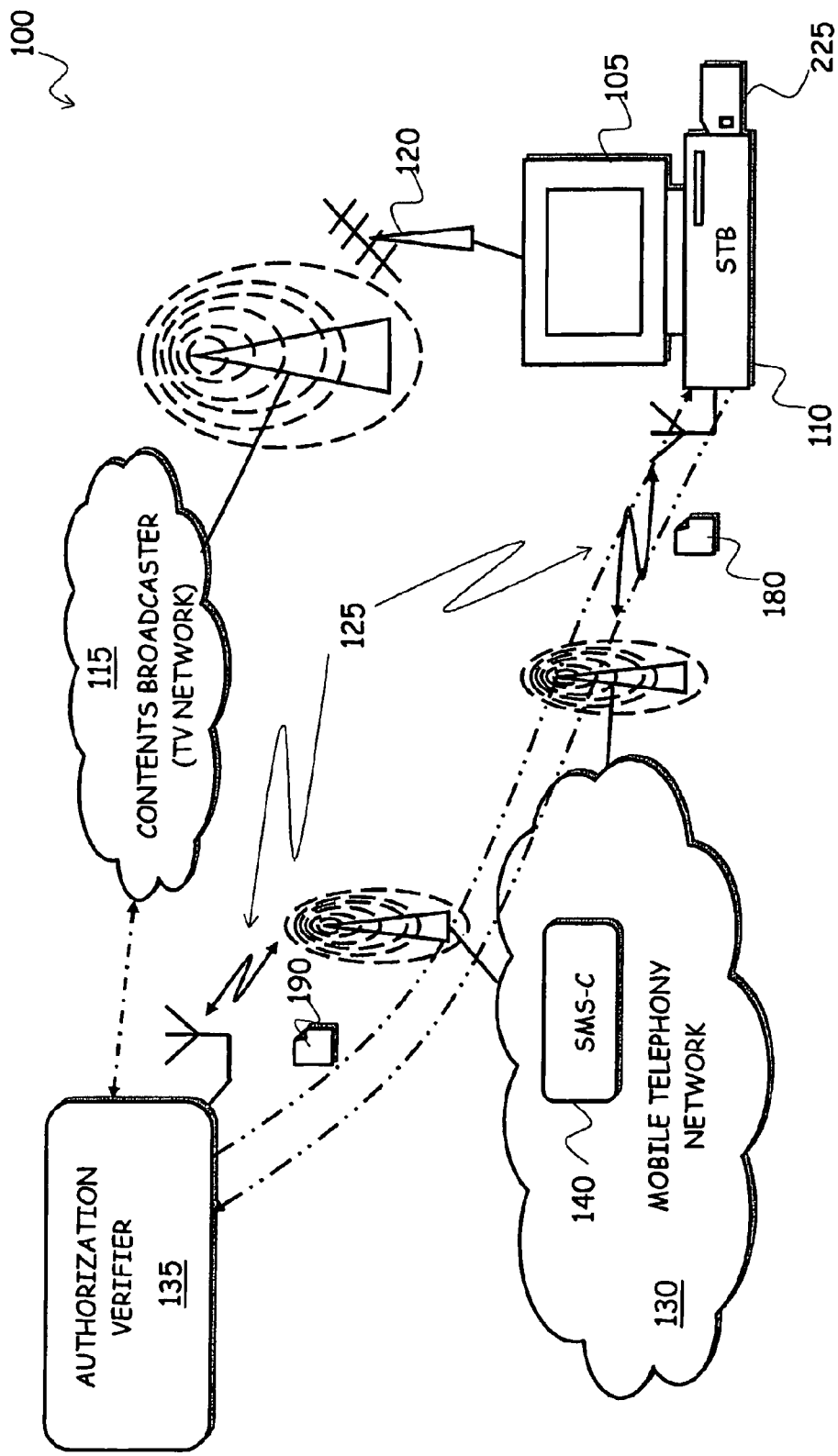
FIG. 1 schematically shows an exemplary scenario in which a method and system according to an embodiment of the present invention is applicable.

Making reference to the drawings, in FIG. 1 there is schematically shown an exemplary scenario 100 in which a method and system according to an embodiment of the present invention is applicable.

A generic user, via a TV set 105 equipped with a suitable receiver equipment 110, for example a Set-Top Box (STB) (the receiving equipment 110 may be either external or integrated in the TV set 105), wishes to enjoy contents made available by a contents broadcaster or contents broadcasting network 115, e.g. broadcasting video and/or audio contents, particularly digital TV, broadcast by a broadcast, e.g. a radio or a TV network.

In particular, but not limitatively, the contents broadcasting network 115 may be a terrestrial or satellite or cable TV broadcasting network, particularly a digital TV broadcasting network, broadcasting programs over channels or bouquet of channels. The receiving equipment 110 may include a DTT (Digital Terrestrial Television) receiver/decoder, a satellite digital TV receiver/decoder, a CATV (CAble TV) receiver/decoder; the specific nature of the receiving equipment is not critical to the present invention. It is also pointed out that, as an alternative to the TV set 105, the user may enjoy the broadcast contents exploiting a media center equipped with a TV receiver/decoder, e.g. a DTT tuner.

Exploiting the receiving equipment 110, the user can receive (for example, through a suitable antenna 120), and, if properly authorized, decode and display contents broadcast by the network 115.

In addition to being able to receive, decode and cause the display of contents broadcast by the network 115, the user's receiving equipment 110 is also adapted to establish a return communications channel (concisely, a return channel) 125. Receiving equipments of broadcast video and/or audio contents with the capability of setting up a return channel are known in the art, as discussed in the foregoing, and are also referred to as iTV (interactive TV) STBs; these STBs, exploiting the return channel, enable the implementation of interactive services such as video on demand, pay per view, home shopping, gaming, etc.

In particular, in a preferred embodiment of the present invention, the user's receiving equipment 110 is adapted to establish the return channel 125 exploiting a wireless connection to a wireless communications system, particularly a Public Land Mobile Network (PLMN) telephony network 130, for example a GSM (General System for Mobile communications) network, or a UMTS (Universal Mobile Telecommunications System) network, or a CDMA2000 (Code Division Multiple Access 2000) network, or any other mobile telephony network, or other types of wireless communications systems, such as for example a WLAN (Wireless Local Area Network).

In an alternative embodiment of the invention, the receiving equipment 110 is adapted to establish the return channel 125 exploiting a wired, PSTN (Public Switched Telephone Network) telephony network.

Embodiments being a mix of the above-mentioned embodiments are also possible, wherein the return channel is partly wireless and partly wired; for example, assuming that at the user's premises a WLAN access point exists, the return channel may include a wireless portion, from the receiving equipment 110 to the WLAN access point, and a wired portion, including the wired IP (Internet Protocol) network, e.g. the Internet.

According to an embodiment of the present invention, the receiving equipment 110 is adapted to communicate, through the return channel 125, with an authorization verifier system 135, having a function of managing the users' authorization to the fruition of the broadcast contents, as will be described in detail later on. The authorization verifier system 135 is in turn in communication with the contents broadcaster 115, particularly (albeit not limitatively) the authorization verifier system 135 may be co-located with other apparatuses of the contents broadcaster 115, or be located in one of the contents broadcaster's premises, or at least be located in a place under control of the contents broadcaster.

In an exemplary but not limitative embodiment of the present invention, the user's receiving equipment 110 and the contents broadcaster's authorization verifier system 135 exchange information through a messaging service of the mobile telephony network 130, particularly using SMS (Short Messaging Service) messages, managed by an SMS center 140.

Figure 2:
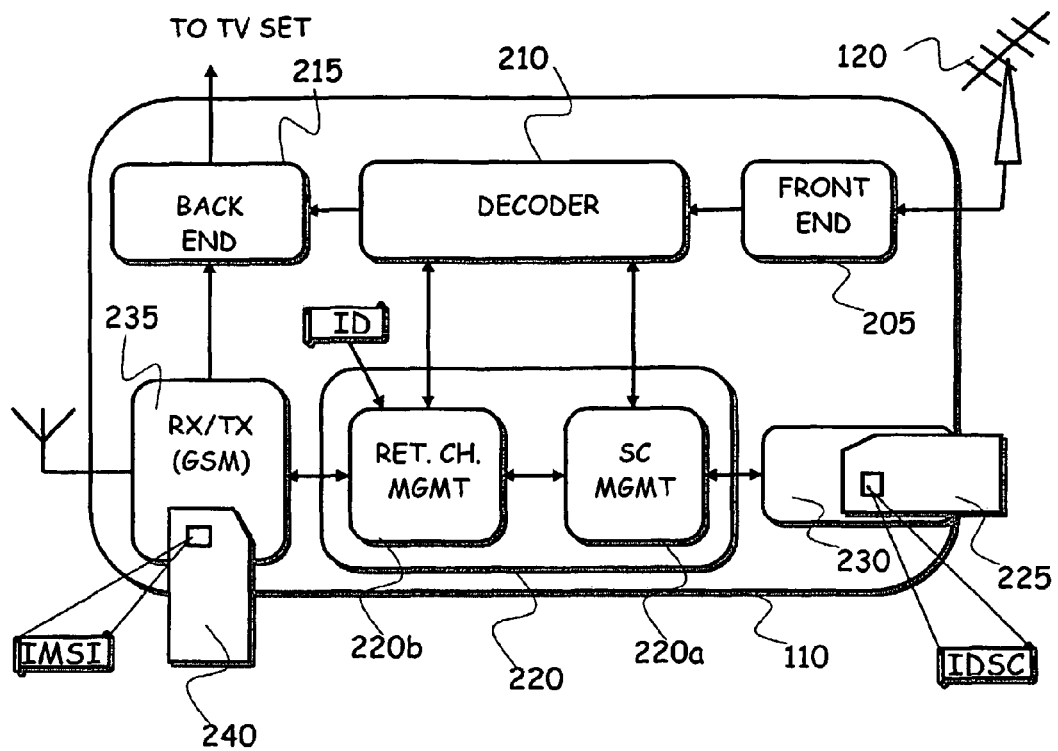
FIG. 2 shows still schematically, but in greater detail, a user's receiving equipment depicted in FIG. 1.

A possible structure of the user's receiving equipment 110 is schematically depicted in FIG. 2, limitedly to the functional modules that are considered relevant to the understanding of the invention embodiment being described.

The broadcast transmissions are received through the antenna 120, which can be a conventional, terrestrial antenna (in the case of, e.g., a terrestrial digital video broadcasting) or a satellite antenna (as is for example the case of a satellite digital video broadcasting).

The received signals are fed to circuits (including Radio-Frequency—RF—circuits) making up a so-called "front-end module" 205, adapted to recover the desired binary data stream from the received signals.

The front-end module 205 feeds the recovered data stream to a decoder module 210, adapted to decode the received data stream (in case the latter is encoded; if the data stream recovered from the received signal is not encoded, because it is freely accessible, the decoder block performs no operations).

The decoder module 210 supplies the decoded data stream to a "back-end module" 215, which renders the decoded data adapted to be displayed on the TV set 105.

In order to perform the data decoding, the decoder module 210 interacts with a CA system module 220, adapted to provide to the decoder module the information necessary for carrying out the decoding process, as will be described in greater detail later on. In particular, the CA system module 220 includes a smart-card manager module 220a adapted to interact with a smart card 225, when the latter is inserted in a suitable smart-card reader interface 230 of which the receiving equipment 110 is provided, so as to be operatively associated thereto.

The smart card 225, provisioned to the user by the contents broadcaster 115 upon subscription, contains information adapted to allow the decoder module 210 to decode the received encoded data stream (provided that the user has subscribed for the fruition thereof). In particular, and by way of example only, the data stored on the smart card may include fruition enablement data which, in particular, may include an indication of the channel/bouquet of channels for which the user has subscribed, the program(s) for which the user has subscribed, and the like. The smart card 225 also has stored therein a unique identifier IDSC, by which that smart card is univocally identified by the provisioning entity, i.e. the contents broadcaster 115.

According to an embodiment of the present invention, the CA system module 220 further includes a module 220b, hereinafter referred to as the return-channel manager module, interacting with the smart-card manager module 230, with the decoder module 210, and with a return-channel communications module 235 adapted to manage communications over the return channel 125. In the preferred invention embodiment herein described, in which the return channel 125 is established exploiting a mobile telephony network, particularly albeit not limitatively a GSM network, the return-channel communications module 235 implements the functions of a GSM communications terminal, and is adapted to establish and/or receive calls and SMS messages over the GSM network 130, in a way totally similar to a conventional GSM mobile phone.

As any communications terminal, the return-channel communications module 235 needs interacting with a Subscriber Identity Module (SIM) 240, typically a smart card; this SIM smart card 240 is not to be confused with the smart card 225 storing the data entitling and allowing the user to decode broadcast video and/or audio streams: the SIM smart card 240, provided by the operator of the mobile telephony network 130 upon subscription of a mobile telephony service contract, is exploited for identification and registration purposes of the return-channel communications module 235 in respect of the mobile telephony network 130. In particular, like any SIM smart card, the SIM smart card 240 has stored therein a unique identifier, the so-called IMSI (International Mobile Subscriber Identity) allowing the mobile telephony network operator univocally identify the return-channel communications block 235. The SIM smart-card 240 may be issued to the contents broadcaster 115 by the mobile telephony network 130 operator.

In addition to interacting with the return-channel manager module 220b in the CA system module 220, for the purposes of verifying the user's authorization to the fruition of broadcast contents (as will be explained later on), the return-channel communications module 235 may also interact with the back-end module 215, for purposes of implementing interactive (e.g., iTV) services.

The receiving equipment 110 is univocally identified by a unique identifier code ID, which is assumed to be stored therein (in a storage area of the receiving equipment); for example, the identifier code ID may include a code portion identifying the receiving equipment's manufacturer, a code portion identifying the receiving equipment model, and a code portion, e.g. a progressive number, identifying that specific receiving equipment among all the units of the same model produced by that manufacturer. Alternatively, in an embodiment like the one herein described wherein the return-channel communications module 235 implements the functions of a GSM communications terminal, the IMSI of the smart card 240 may form the identifier code ID of the receiving equipment.

Figure 3:
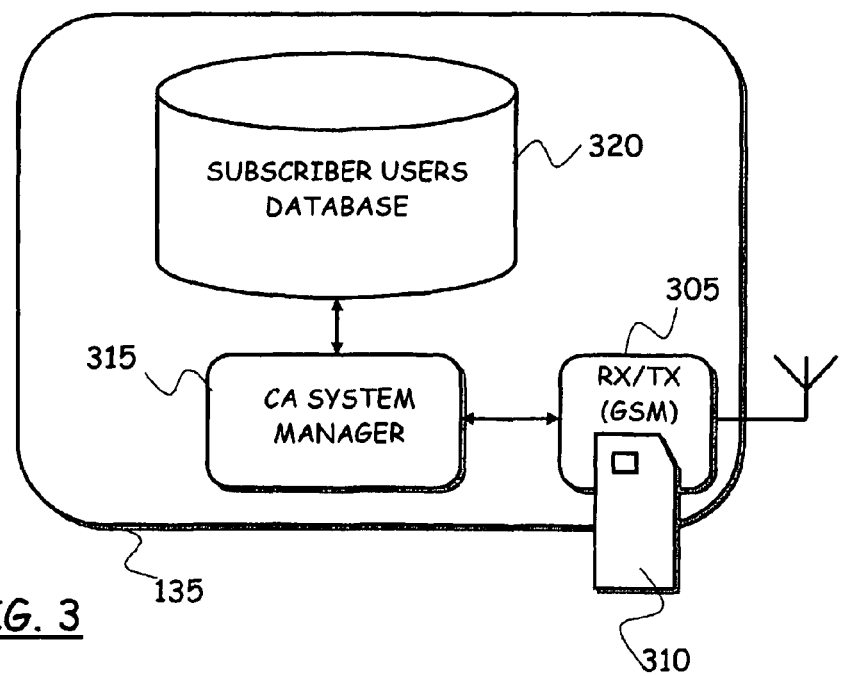
FIG. 3 shows, still schematically, but in greater detail, an authorization verifier system depicted in FIG. 1.

Referring now to FIG. 3, a schematic functional block diagram of the authorization verifier system 135 is depicted. In an embodiment of the invention, the authorization verifier system 135 includes, similarly to the receiving equipment 110, a communications module 305, adapted to communicate over the return channel 125 with the return-channel communications modules 235 present in the receiving equipments; in particular, in an embodiment of the present invention the communications block 305 is adapted to communicate over a wireless communications channel, particularly it implements the functions of a GSM communications terminal, and is adapted to establish and/or receive calls over the GSM network 130, in a way totally similar to a conventional mobile phone. In particular, the communications module 305 is adapted to colloquiate, exploiting the GSM network 130, with the return-channel communications modules 235 in the receiving equipments 110 dislocated at the users' premises. It is observed that in alternative embodiments of the invention, the communications module 305 may be adapted to establish a different type of wireless connection, or even a connection to a fixed network (e.g., a PSTN).

In the exemplary embodiment of the invention herein considered, the communications module 305 interacts with a respective SIM 310, typically a smart card, provided by the operator of the mobile telephony network 130 upon subscription thereto, and exploited for identification and registration purposes of the communications module 305 in respect of the mobile telephony network 130.

The communication module 305 interacts with a CA system manager module 315, responsible of verifying the users' entitlement to the fruition of specific broadcast contents.

In order to perform this verifying function, the CA system manager module 315 interacts with a database 320 (the subscriber users database) of subscriber users data. In particular, the subscriber users database 320 stores, for the generic subscriber user of the contents broadcaster 115), a code corresponding to the identifier MSC of the smart card 225 provisioned to that user (more than one of such smart-card identifiers may be stored in respect of a same user, in case that user subscribes, at different times, to the fruition of different broadcast contents), a code corresponding to the receiving equipment identifier code ID (similarly, more than one of such receiving equipment identifier codes may be stored in respect of a same user, so as to allow that user to enjoy the broadcast contents exploiting different receiving equipments, possibly located at different premises, for example one at the user's main domicile, the other at the holiday home, or even different receiving equipments in different rooms of the user's house), and data concerning the contents (e.g., channels, programs) to which that user has subscribed. The table below gives a schematic, exemplary and non-limitative pictorial representation of the way the data may be stored in the subscriber users database (it is observed that, in actual implementations, the specific structure of the database may greatly vary, depending for example on the type of database management system adopted):

| USER | IDSC | ID | AUTHORIZED CONTENTS |
|---|---|---|---|
| USERa | IDSCa | IDa1, IDa2 | PGM1, PGM2 |
| USERb | IDSCb1, IDSCb2 | IDb | PGM1 PGM3 |
| ... | ... | ... | ... |

In the above example, the subscriber user USERa, to which the smart card identified by the code IDSCa has been provisioned, and having two receiving equipments identified by the codes IDa1, IDa2, has subscribed to the fruition of the broadcast contents PGM1 and PGM2 (e.g., a motion picture, a sport event, or the like); the other subscriber user USERb, to which the two smart cards identified by the codes IDSCb1 and IDSCb2 have been provisioned, and having the receiving equipment identified by the code IDb, has subscribed for the contents PGM1 (corresponding to the smart card code IDCSb1a) and PGM3 (corresponding to the smart card code IDCSb2).

The CA system manager module 315, exploiting the information stored in the database 320, is adapted to verify whether a generic user is entitled or not to enjoy a given broadcast content, as will be described in the following.

The authorization verifier system 135 may include one or more data processing apparatuses, of suitable data processing and storage power, executing an application software designed to implement the function that will be described hereinbelow.

The operation of the system described hereinabove will be now explained, with the help of the schematic, simplified flowcharts of FIGS. 4 and 5, which provide a pictorial representation of a method according to an embodiment of the present invention.

When a user wishes to enjoy specific contents (e.g., a specific TV channel or program) broadcast by the contents broadcaster (the TV network) 115, which contents are not freely accessible, he/she needs to subscribe with the contents broadcaster. In order to become a subscriber, the user may have to furnish personal information such as his/her name, address, birthdate/birthplace and the like, and he/she usually have to pay a prescribed amount for enjoying the contents, or to furnish his/her credit card details.

As a result of the subscription procedure, the contents broadcaster provisions to the user a personal smart card 225, entitling him/her to the fruition of the specified contents, to be used in conjunction with the user's receiving equipment 110. According to an embodiment of the present invention, when the user subscribes and the smart card is issued, the contents broadcaster ensures that an entry in respect of the new subscriber user is created in the subscriber users database 320, and that the relevant user data are stored therein; such user data includes in particular the identifier IDSC of the smart card 225 that has been provisioned to the user.

It is observed that in case, after the first subscription, the same user wishes to subscribe to enjoy additional, different contents broadcast by the same contents broadcaster 115, a new smart card may be provisioned to the user; in this case, in the subscriber users database 320, the identifier IDSC of the new smart card will be adjoined to the identifier IDSC of the old smart card, without necessarily creating a new database entry in respect of the same subscriber user; however, nothing prevents that, in alternative embodiments of the invention, each time a user subscribes for additional broadcast contents, a new entry is created in the database in respect of the user; as a still further alternative, when a user who is already a subscriber subscribes for additional services, the old smart card may be deactivated (the old smart card identifier IDCS is removed from the database 320), and a new smart card is issued (and its identifier IDSC is put into the database 320), entitling the user to enjoy all the contents for which he/she has subscribed.

The subscription process may take place remotely, for example by phone, or on-line via Internet; the smart card 225 can for example be sent by mail or courier directly to the user's address.

It is also observed that, in an embodiment of the present invention, upon subscribing, the user may specify how many receiving equipments 110 he/she prefers to be able to exploit for the fruition of the specified contents (for example, the user may wish to have the possibility of enjoying the specified contents not only at his/her main domicile, but also at his/her holiday home, or at a relative's house, and the like, or the user may have more than one receiving equipment available at his domicile, for example located in different rooms); in the subscriber users database 320, particularly in the field dedicated to storing the identifier(s) ID of the user's receiving equipment(s), a number of places is allotted equal to the number of receiving equipments specified by the user upon subscribing; such place(s) in the database may be filled in with the receiving equipment(s) identifier provided by the user, who can for example read it (them) on a label attached to the receiving equipment(s), or to a package thereof, or they may be left initially void. The contents broadcaster may also by default reserve to the generic subscriber user the possibility of exploiting a prescribed number of different receiving equipments (i.e., a default number of places are allotted in the database 320, which may be initially left, all or in part, void)

When the user wishes to enjoy the broadcast contents for which he/she has subscribed (for example, at the date/time the TV network has scheduled for broadcasting the desired program is, or just when the user prefers, in an on demand system), the user turns the TV set 105 and the receiving equipment 110 on, ensure that the smart card 225 is inserted into the reader 230 of the receiving equipment 110, and tunes the latter onto the proper channel (for example, the broadcast channel of the TV network 115 on which the desired content will be broadcast).

The broadcast transmission, received by the receiving equipment 110 through the antenna 120, is processed by the front-end module 205, and the binary data stream (e.g., audio and video) related to the broadcast contents is recovered.

Figure 4:
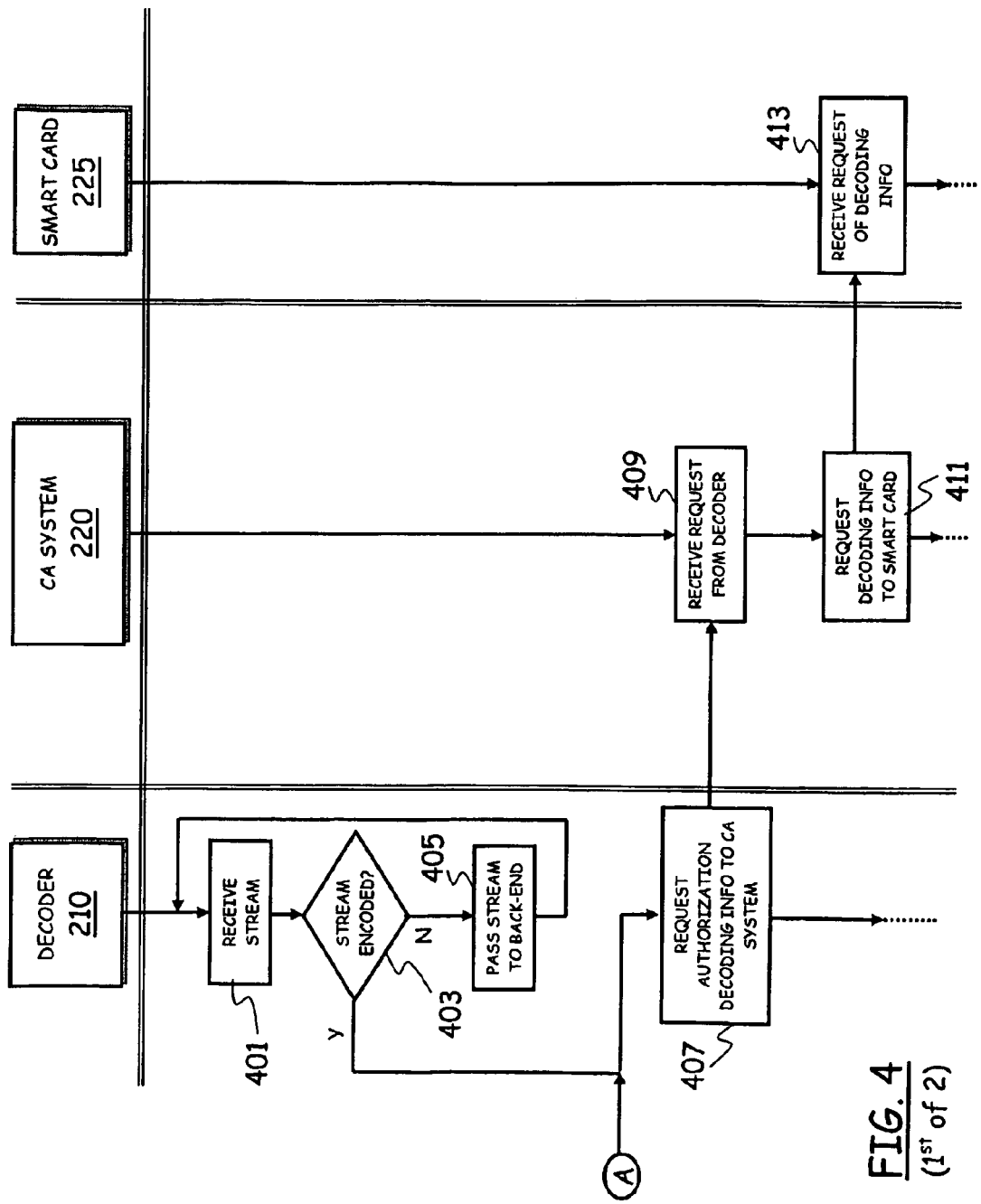
FIGS. 4 and 5 are schematic flowcharts showing some steps of a method according to an embodiment of the present invention.
Figure 4:
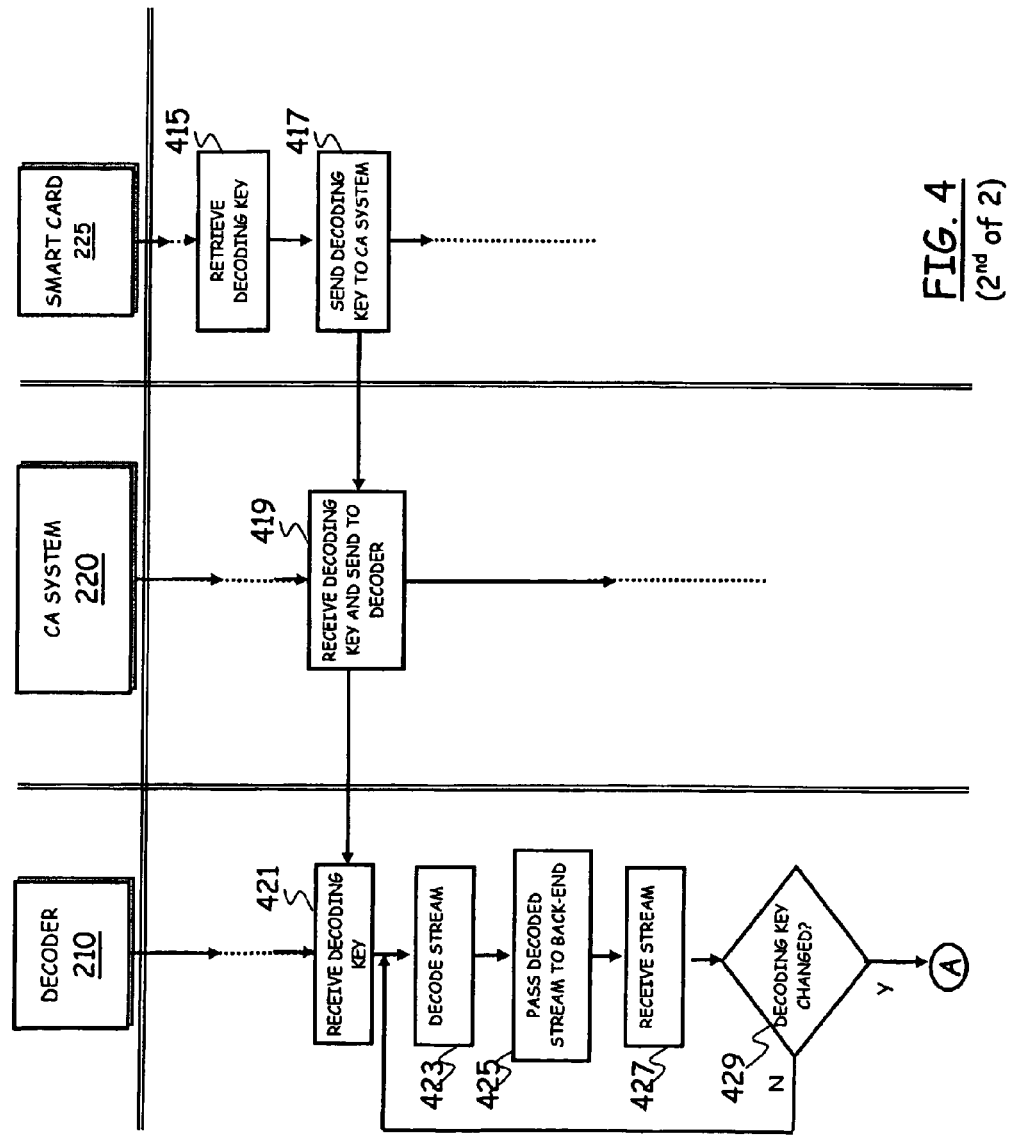

The recovered stream is passed to and received by the decoder module 210 (block 401 of FIG. 4).

If the recovered stream is not encoded (decision block 403, exit branch N), as in the case of a free broadcast transmission, the decoder module 210 passes the stream over to the back-end module 215 (block 405), which manages the adaptation of the stream to the format supported by the TV set 105. The operations (blocks 401 and 403) are repeated, and the broadcast contents can be freely enjoyed by the user.

Let it be assumed that the received stream is instead encoded (decision block 403, exit branch Y): in order to make the contents enjoyable by the user, the decoder 210 has to decode the received stream before passing it to the front-end block 215.

The way the broadcast stream is received and decoded is known per-se, and is for example described in the document available (at the filing date of the present application) on the Internet at the address http://www.ce.unipr.it/~petrolin/livestreamer/dvb%20e%20TS.htm.

Without entering into details, known to those skilled in the art, in order to decode the recovered, encoded stream, the decoder module 210 cooperates with the CA system module 220, periodically asking thereto the authorization to decode, and the decoding information necessary to perform the decoding process (block 407). Merely by way of example, in DVB only the video part of the broadcast contents is encoded, whereas the audio part thereof is not encoded. The video part of the broadcast stream is for example encoded by means of the Common Scrambling Algorithm (CSA) encoding algorithm, with a time-variable encoding/decoding key K. The decoder module 210 is adapted to apply the (inverse) CSA to the recovered, encoded data stream, but in order to do so it needs to know which is the encoding/decoding key K to be used. The contents broadcaster 115 broadcasts the information necessary to the receiving equipment 110 for obtaining the encoding/decoding key K, in an encrypted form exploiting an encryption algorithm that usually varies from CA system to CA system, together with the encoded contents, exploiting so-called Entitlement Control Messages (ECMs). The decoder module 210 requests to the CA system module 220 to retrieve the encoding/decoding key K which the decoder 210 needs for decoding the encoded data stream.

The smart card management module 220a of the CA system 220 receives the request from the decoder module 210 (block 409), it extracts from the ECMs received together with the encoded stream the encrypted information for retrieving the encoding/decoding key K, and issues to the smart card 225 in the reader 230 a request for the encoding/decoding key K (block 411).

The request issued by the smart card management module 220a is received by the smart card 225 (block 413). The smart card has stored therein a decryption key K-CAS necessary for decrypting the encrypted information received through the ECMs and passed thereto by the smart card management module 220a; the smart card 225 checks whether the authorization data ("access rights") stored therein entitle the user to decode the desired contents; the decryption key K-CAS and the access rights are for example sent to the smart card by the contents broadcaster by means of Entitlement Management Messages (EMMs), broadcasted similarly to the ECMs. In the affirmative case, the smart card 225 uses the decryption key K-CAS in a decryption process for decrypting the information received through the ECMs, thereby retrieving the encoding/decoding key K (block 415); the retrieved key K is sent to the smart card management module 220a of the CA system module 220 (block 417), which receives the encoding/decoding key K and forwards it to the decoder module 210 (block 419). The decoder module 210 receives the encoding/decoding key K (block 421), and uses it for decoding the encoded stream, to be then passed to the back-end module 215 (blocks 423 and 425), for being displayed by the TV set.

It is observed that, depending on the particular implementation of the CA system, additional interactions between the CA system and the smart card may be envisaged, specific to that CA system implementation, which are however not essential to the invention embodiment described herein.

The decoder module 210 continues to receive the stream (block 427), to decode it (block 423) and to pass the decoded stream to the back-end module 215 (block 425), until an ECM signals that the decoding key has changed (decision block 429, exit branch Y): when this occurs, the procedure is repeated (connector A).

Figure 5:
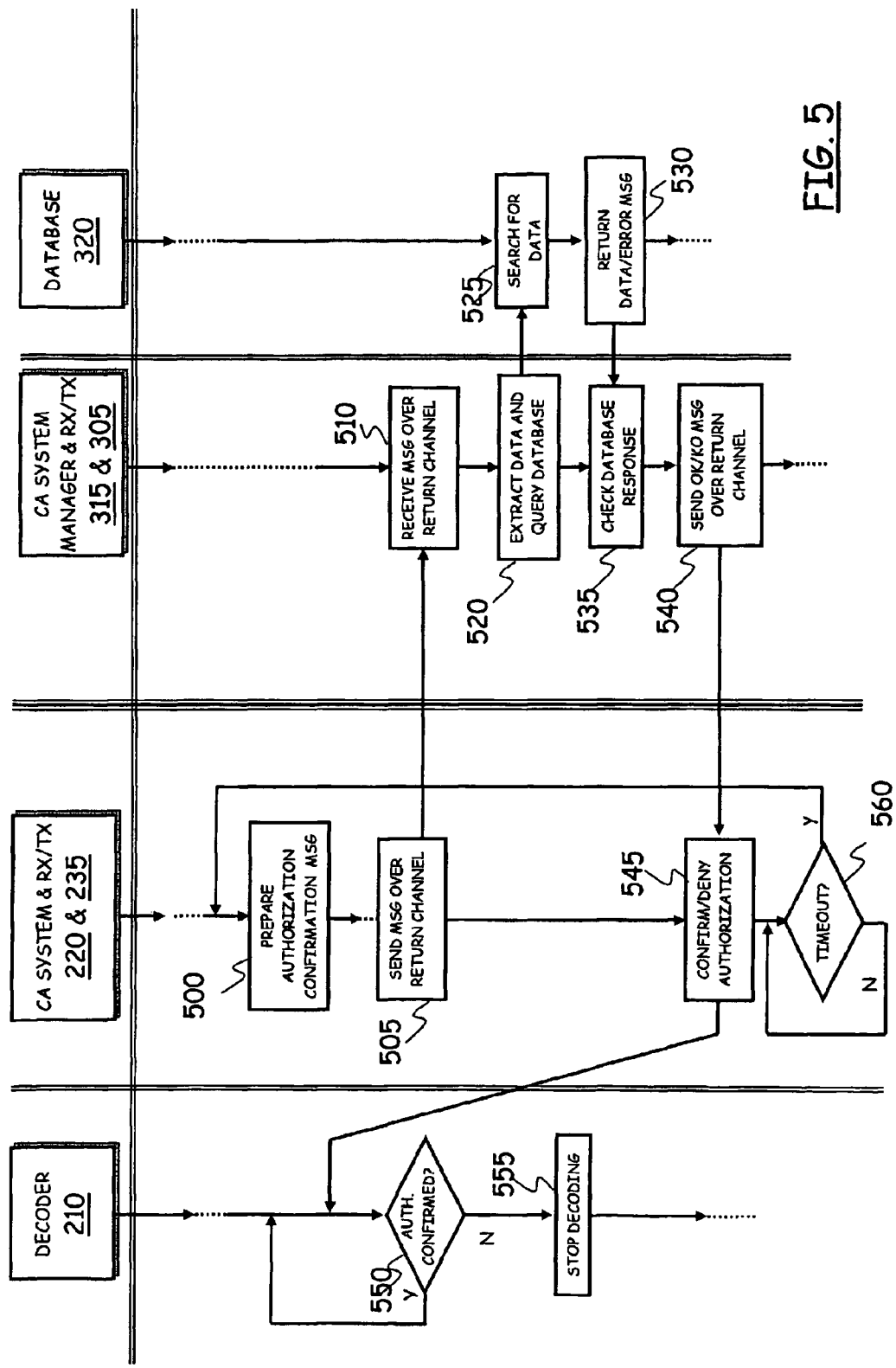

Referring to FIG. 5, according to an embodiment of the present invention, in addition to carrying out the above described operations of receipt of the encoded stream and decoding thereof based on the information available in the smart card, the receiving equipment 110 implements a procedure directed to obtaining, directly from the contents broadcaster, or in any case from an entity related thereto and distinct from the smart card inserted in the receiving equipment, a confirmation of the user's authorization to enjoy the broadcast encoded contents.

In particular, the return channel management module 220b of the CA system 220, for example in response to the request received from the decoder module 210 (at block 409, FIG. 4), prepares (block 500) an authorization confirmation request, which will be sent to the authorization verifier system 135. The authorization confirmation request includes in particular the identifier ID of the receiving equipment 110, for example read out from the storage area thereof, as well as the identifier IDSC of the smart card 225 and the fruition enabling data of the subscriber (e.g., the channel(s) and/or the audio/video program(s) for which the user has subscribed); the smart card identifier IDSC and the fruition enabling data are read out from the smart card 225, for example exploiting the services of the smart card manager module 220a. Alternatively, the authorization confirmation request can include a combination between the identifier ID of the receiving equipment 110 and the identifier IDSC of the smart card 225 or the identifier ID of the receiving equipment 110 as well as an identifier of a second smart card provisioned to the user upon subscription or a combination thereof. A predetermined request type identification code is inserted in the authentication verification request. The position of the different pieces of information within the authentication verification request may have to comply to a predetermined protocol.

Optionally, the data included in authorization confirmation request may be protected by a suitable encryption (in this case, the authentication verification request will include an encryption identifier code identifying the data as encrypted).

The return channel management module 220b then asks the return-channel communications module 235 to send the authorization confirmation request to the authorization verifier system 135, exploiting the return channel. The return-channel communications module 235, which in the example herein considered is adapted to communicate over the GSM network 130, sends the authorization confirmation request, for example in the form of an SMS message (schematically identified as 180 in FIG. 1), dialing the telephone number of the authorization verifier system 135 (block 505); the telephone number of the authorization verifier system 135 is for example stored in the smart card 225, and is retrieved therefrom by the return-channel management module 220b; alternatively, the telephone number of the authorization verifier system 135 may be stored in an address book of the return-channel communications module 235, having been for example set directly by the subscriber user, or in the SIM card 240. The telephone number of the authorization verifier system 135 may be a mobile telephony number, as in the example herein considered, or a fixed telephony number.

The SMS message 180 carrying the authorization confirmation request is received at the SMS center 160 of the mobile telephony network 130, and is forwarded as any other SMS message to the proper destination number, that corresponds to the communication module 305 of the authorization verifier system 135.

The SMS message carrying the authorization confirmation request is received by the communication module 305 of the authorization verifier system 135 (block 510).

The communication module 305 passes the received message to the CA system manager 315; the CA system manager 315 recognizes the message by the message type identification code present therein (and decrypts the message, in case from the encryption identifier code it results that the message is encrypted). The CA system manager 315 then extracts from the received message the smart card identification code IDCS, the user's receiving equipment identification code ID, and the contents fruition enabling data (block 515).

According to an embodiment of the present invention, using the smart card identifier IDSC as an accession key, the CA system manager 315 performs a query on the subscriber users database 320 (block 520).

The subscriber user database 320 looks for an entry containing the specified smart card identifier IDSC (block 525). In case the specified smart card identifier IDSC is not found, the database 320 returns to the CA system manager 315 an error message (block 530); if instead the smart card identifier IDSC is found in the database 320, the identifier(s) ID of the user's receiving equipment(s) and the data specifying the channel(s)/program(s) which the user is enabled to decode are retrieved and returned to the CA system manager 315 (block 530).

The CA system manager 315 checks the result of the query on the database 320 (block 535); in case the database response is an error message (because the smart card identifier IDSC has not been found in the database), or in case the identifier(s) ID of the user's receiving equipment(s) retrieved from the database 320 do(es) not correspond to the receiving equipment identifier ID received with the SMS message (and the subscriber user has already exploited all the admissible different receiving equipments, i.e., there are no more free places in the database for specifying an additional receiving equipment identifier), or in case the data specifying the channel(s)/program(s) which the user is enabled to decode do not correspond to the contents fruition enabling data received with the SMS message, the CA system manager 315 prepares an authorization deny notification.

If instead (one of) the identifier(s) ID of the user's receiving equipment(s) retrieved from the database 320 corresponds to the receiving equipment identifier ID received with the SMS message, and the data specifying the channel(s)/program(s) which the user is enabled to decode correspond to the contents fruition enabling data received with the SMS message, the CA system manager 315 prepares an authorization confirmation notification.

If the data specifying the channel(s)/program(s) which the user is enabled to decode correspond to the contents fruition enabling data received with the SMS message, but the receiving equipment identifier ID received with the SMS message does not correspond to (any one of) the identifier(s) ID of the user's receiving equipment(s) retrieved from the database 320, and provided that the subscriber user has not yet exploited all the admissible different receiving equipments available, the receiving equipment identifier ID received with the SMS message is stored in the database 320

Optionally, the authorization confirmation/deny notification may be encrypted. The CA system manager 315 passes the authorization confirmation/deny notification to the communications module 305, which manages the sending of a reply SMS message (indicated as 190 in FIG. 1) to the SMS message received from the user's receiving equipment 110; in particular, the communication module 305 retrieves from the received SMS message the telephone number of the SIM 240 exploited by return-channel communications module 235 of the user's receiving equipment 110 (similarly, in the alternative case in which the return channel is established through a PSTN, the communications module 305 uses, for replying to the authentication confirmation request, the telephone number from which the authentication confirmation request has been received). The communications module 305 then sends the SMS message 190 carrying the authorization confirmation/deny notification (block 540).

The SMS message carrying the authorization confirmation/deny notification is received at the SMS center 160 of the mobile telephony network 130, and is as usually forwarded to and received at the return-channel communications module 235 of the receiving equipment 110.

The return-channel communications module 235 passes the received notification to the return-channel management module 220b of the CA system 220; the return-channel management module 220b processes the received notification and ascertains whether the authorization to decode and enjoy the contents has been confirmed or, rather, it has been denied. The return-channel management module 220b of the CA system module 220 provides to the decoder module 210 the received authorization confirmation/denial (block 545).

Responsive to the authorization confirmation/denial received from the return-channel management module 220b the decoder module 210, in case the authorization has been denied (exit branch N of decision block 550), stops the decoding process (block 555), so that the user can no more enjoy the broadcast contents. If instead the authorization has been confirmed (exit branch Y of decision block 550), the decoder module 210 continues to decode the received, encoded stream, and to pass it to the back-end module.

After a prescribed period of time has lapsed (decision block 560, exit branch Y), the decoding authorization information needs to be asked again to the CA system 220, and the procedure is performed again.

In an embodiment of the present invention, the CA system module 220 of the receiving equipment 110, particularly the return-channel management module 220b waits for the reply authorization confirmation/denial notification from the authorization verification system 135 for a limited, predetermined time after the authorization confirmation request has been sent; in case within such prescribed time no authorization confirmation/denial notification is received in reply to the authorization confirmation request, the CA system module 220 instructs the decoder module 210 to stop the decoding of the received stream. In this way, it is avoided that a non-entitled user may enjoy the contents simply because the receiving equipment 110 is placed out of coverage by the mobile telephony network (in which case the receiving equipment is not in condition to send the authorization confirmation request). The CA system module 220 may also check the availability of a return communication channel, e.g., the return-channel manager module 220b may get from the return-channel communications module 235 the information that there is no GSM coverage, thereby no authorization confirmation request can be sent to the authorization verifier system; the CA system module 220 may in this case wait for a predetermined time: if, after such a time period has lapsed, it has not been possible to send the authorization confirmation request, the CA system module 220 preferably instructs the decoder module 210 to stop the decoding process.

In case the decoding process of the encoded contents stream is inhibited/stopped due to a missing reply to the authorization confirmation request within the prescribed: time, the receiving equipment 110 (e.g., the return-channel manager module 220b, through the return-channel communications module 235) may cause the TV set 105 to display a message/image requesting the user to contact the contents broadcaster 115. A user who has duly subscribed to the contents broadcaster thus can, by contacting the latter, for example by the PSTN, restore the functionality of the receiving equipment 110 and enjoy again the broadcast contents, preferably for an unlimited or, alternatively, for a limited time period, determined by the contents broadcaster. For example, the contents broadcaster, based on the receiving equipment identification code, or the receiving equipment's brand and model, and on the smart card identification code, provides to the user a code (for example, dependent on the receiving equipment identification code and the smart card identification code) having a limited time validity to be input via the receiving equipment remote control so as to restore the normal functionality.

In order to avoid fraudulent fruition of encoded contents by unauthorized, non-subscriber users, the CA system module 220 of the receiving equipment 110 preferably manages the time out for receiving the authorization confirmation/denial notification in an incremental way, so that even if the receiving equipment is repeatedly turned on and off and on again, the computation of the time out for receiving the authorization confirmation does not restart each time from the beginning; the time out is instead reset once the authorization confirmation is received by the receiving equipment.

In an embodiment of the present invention, the authorization verifier 135 may implement a control on the current state of the receiving equipment(s) of a generic subscriber. For example, in the database 320 a "busy" flag may be associated with the generic smart card identifier, such a flag being adapted to signal a current busy state of (one of) the receiving equipment identifier(s) associated with that smart card identifier; such flag may be set when an authorization confirmation request is received by (one of) the receiving equipment(s) of that subscriber user; the busy flag is kept set for a predetermined time, lapsed which it is reset, but it is set every time an authorization confirmation request is received. When an authorization confirmation request carrying that smart card identifier is received, the CA system manager checks whether the busy flag is already set, in which case the user is already enjoying the contents (possibly on another receiving equipment); then, the receiving equipment identifier included in the received authorization confirmation request is checked, and if it relates to a receiving equipment different from the one that results busy at that time, the authorization confirmation is granted (as described above), contrarily the authorization confirmation is denied.

In this way, unauthorized simultaneous fruition of broadcast contents by a user (for example caused by a cloning of the smart card) can be forbidden.

As a further possibility, it may be provided that, in the authorization confirmation request, geographical localization coordinates of the receiving equipments are included, for example provided by exploiting the Global Positioning System (GPS); the CA system manager may in this case check whether the geographical coordinates received with the authorization confirmation request fall in a predetermined range around a prescribed geographical location, set at the subscription time (for example, some meters), and in the affirmative case the authorization confirmation is granted. In this way, it is possible to confirm the authorization to enjoy contents through different receiving equipments located for example in different rooms in the subscriber user's house.

Thanks to the present invention, the fruition of broadcast contents that are not freely accessible, depends not only on an entitlement rights check performed locally at the receiving equipment, e.g. relying on the smart card, but also on an authorization verification process performed remotely from the user's premises; by advantageously exploiting the return communications channel capabilities available in the receiving equipment. The control of the user's authorization to decode and enjoy the broadcast contents is thus not totally under the user's control: the contents broadcaster participates in the verification of the user's rights to access the encoded broadcast contents.

It can also be noted that the present invention guarantees the backward compatibility to the legacy receiving equipments. In fact, if the user has a receiving equipment that does not implement the present invention, he will be able to continue enjoying the broadcast contents. Simply, the legacy receiving equipment will be limited to the first fruition entitlement check, as, described in the prior art, and it will not make use of the improved security check as the foreseen by the present invention. This point is relevant especially for a content broadcaster that wants to improve its conditional access security using receiving equipments based on the present invention. Thanks to the complete backward compatibility of the present invention, the content broadcaster may change progressively the receiving equipments of its subscribers, without to cope with a reduced user satisfaction due to compatibility problems.

As mentioned in the foregoing, any type of return communications channel may be exploited, for example the PSTN (exploiting the wired telephony line of the user). However, the use of a wireless return communications channel, implemented by means of a mobile telephony network (e.g., a GSM, or a UMTS, or a CDMA2000 network), or a wireless packet-switched connection such as a WLAN, may in some cases be preferred.

For example, if the return channel uses the PSTN, the user needs to connect the receiving equipment to the telephone plug; if instead the receiving equipment has integrated therein a wireless communications module, adapted for example to connect to a WLAN access point, or to a mobile telephony network, the user may be not even informed of the added feature of the receiving equipment, and this may in some cases increase the system robustness (some users may be tempted to tamper the device). Also, the provision of an integrated wireless communications module relieves the user from the burden of having a wireless terminal, e.g. a mobile phone, and to keep it busy for the receiving equipment needs.

Also, the use of a wireless return channel avoids that the user's PSTN line stays busy when the receiving equipment needs to contact the authorization verifier system, or that, if the user's PSTN line is busy for different reasons, the CA system in the receiving equipment inhibits the decoding of the contents due to an impossibility of contacting the authorization verification system and/or receiving the authorization confirmation therefrom.

The costs for the communications, over the return channel, between the user's receiving equipment and the authorization verification system may be partly or entirely charged to the contents broadcaster (to this purpose, the authorization verification system may be contacted through a toll-free telephone number).

In the invention embodiment described in the foregoing, the responsibility of contacting the authorization verification system was up to the CA system of the receiving equipment. In alternative embodiments of the invention, it may be provided that, in substitution or in addition thereto, the authorization verification system polls, for example periodically, the receiving equipments of all the subscriber users in the subscriber users database, so as to check that everything is in order (in this case, the subscriber users database will also include the information necessary to the authorization verification system for contacting the receiving equipments, for example the GSM telephone number of the return-channel communications module). As a further alternative, the authorization verification system may contact those receiving equipments from which no calls are received since a predetermined time.

In the embodiment of the invention described above, in order to confirm or deny the authorization to decode the encoded contents the authorization verification system checks the correspondence between the receiving equipment identifier, received by the authorization confirmation request, and the (one or more) receiving equipment identifier(s) present in the subscriber users database. In order to enable a subscriber user to enjoy the contents on a receiving equipment different from that (those) normally used, for example one of a friend, it may be provided that the check of the receiving, equipment identifier be, at least temporarily, disabled; for example, the subscribed user may have the control on the receiving equipment identifier code disabled by placing a request (e.g., by phone) to the contents broadcaster.

After a prescribed time has lapsed, the authorization verification system reactivates the check on the receiving equipment identifier. Alternatively, the authorization verification may be based only on the correspondence of the smart card identifier and the smart card fruition enabling data.

In alternative embodiments of the invention, the receiving equipment identifier code may be a MAC (Media Access Control) address assigned to the receiving equipment for accessing the return channel.

The invention claimed is:

1. A method for conditionally allowing fruition of broadcast contents, broadcast by a contents broadcaster and received by a user by means of receiving equipment, comprising:
performing, locally at the receiving equipment of the user, a first fruition entitlement check based on first fruition entitlement data available locally at the receiving equipment;
at the receiving equipment, conditioning the fruition of the broadcast contents based on a result of said first fruition entitlement check;
providing to the contents broadcaster second fruition entitlement data exploiting a return communications channel of the receiving equipment, wherein the return communications channel is a messaging service of the mobile telephony network;
conditioned on a result of a second fruition entitlement check, receiving a fruition entitlement confirmation notification from the contents broadcaster via the return communications channel, wherein the second check is based on a comparison between the second fruition entitlement data and third fruition entitlement data available locally to the contents broadcaster.

2. The method according to claim 1, comprising, at the receiving equipment, conditioning the fruition of the broadcast contents based on the receipt of the fruition entitlement confirmation notification from the contents broadcaster.

3. The method according to claim 2, wherein said performing, locally at the receiving equipment of the user, a first fruition entitlement check based on first fruition entitlement data available locally at the receiving equipment, comprises exploiting information provided to the user by the contents broadcaster upon subscription to the fruition of the broadcast contents.

4. The method according to claim 3, wherein said second fruition entitlement data comprises data stored on a smart card provisioned to the user upon subscription and operatively associated with the receiving equipment.

5. The method according to claim 4, wherein said second fruition entitlement data comprises an identifier of the smart card provisioned to the user upon subscription, fruition enabling data stored in the smart card, said fruition enabling providing an indication of the contents whose fruition is authorized, and an identifier of the receiving equipment.

6. The method according to claim 5, wherein said second fruition entitlement check comprises comparing the identifier of the smart card provisioned to the user received from the receiving equipment, to a smart-card identifier code stored at the contents broadcaster.

7. The method according to claim 5, wherein said second fruition entitlement check comprises comparing the identifier of the receiving equipment to at least one receiving-equipment identifier code stored at the contents broadcaster.

8. The method according to claim 5, wherein said second fruition entitlement check comprises comparing the fruition enabling data sent from the receiving equipment to fruition-enabling data stored at the contents broadcaster.

9. The method according to claim 1, wherein said providing to the contents broadcaster the second fruition entitlement data and receiving a fruition entitlement confirmation notification comprises exploiting an SMS messaging service of the mobile telephony network.

10. Receiving equipment for receiving contents broadcast by a contents broadcaster, comprising a conditional access system adapted to conditionally allow fruition of the broadcast contents based on a first fruition entitlement check performed locally at the receiving equipment exploiting first fruition entitlement data available locally at the receiving equipment; and
a communicator module adapted to communicate over a return communications channel, wherein the return communications channel is a messaging service of the mobile telephony network; and
a fruition authorization confirmation manager module cooperating with the communicator module and adapted to send fruition authorization confirmation requests to a predetermined, remote authorization manager exploiting the return communications channel, said fruition authorization confirmation requests comprising second fruition entitlement data, and to receive, over the return communications channel, of fruition entitlement confirmations by the remote authorization manager.

11. Receiving equipment according to claim 10, wherein said conditional access system is adapted to perform said first fruition entitlement check by cooperating with a smart card provisioned to the user upon subscription and operatively associated with the receiving equipment.

12. The receiving equipment according to claim 11, wherein said second fruition entitlement data comprise an identifier of the smart card provisioned to the user upon subscription, fruition enabling data stored in the smart card, said fruition enabling providing ail indication of the contents whose fruition is authorized, and an identifier of the receiving equipment.

13. Receiving equipment according to claim 10, wherein said communicator module is adapted to send the authorization confirmation requests and to receive the authorization confirmations exploiting an SMS messaging service of the mobile telephony network.

14. A contents broadcasting system for broadcasting contents over a broadcast channel, said contents being adapted to be conditionally accessible by a user exploiting receiving equipment, said access to said contents being conditioned by a first fruition entitlement check based on first fruition entitlement data available locally at the receiving equipment; comprising:
a fruition authorization verifier adapted to communicate with the receiving equipment over a return communications channel of the receiving equipment, wherein the return communications channel is a messaging service of the mobile telephony network, said authorization verifier being further adapted to:
receive from the receiving equipment fruition authorization requests comprising second contents fruition entitlement data available locally at the receiving equipment;
perform a second fruition entitlement check based on a comparison between the received second fruition entitlement data and third fruition entitlement data available locally to the contents broadcaster; and
conditioned on a result of the second check, provide to the receiving equipment exploiting the return communications channel, a fruition entitlement confirmation notification.

15. The contents broadcasting system according to claim 14, wherein said first fruition entitlement data comprise data stored on a smart card provisioned to the user upon subscription and adapted to be operatively associated with the receiving equipment.

16. The contents broadcasting system according to claim 15, wherein said second fruition entitlement data comprise an identifier of the smart card provisioned to the user upon subscription, fruition enabling data stored in the smart card, said fruition enabling providing an indication of the contents whose fruition is authorized, and an identifier of the receiving equipment.

17. The contents broadcasting system according to claim 16, wherein the fruition authorization verifier is adapted to perform said second check by comparing the identifier code of the smart card provisioned to the user and received from the receiving equipment, to a smart-card identifier code stored at the authorization verifier.

18. The contents broadcasting system according to claim 16, wherein the fruition authorization verifier is adapted to perform said second check by comparing the identifier code of the receiving equipment received therefrom to at least one receiving-equipment identifier code stored at the authorization verifier.

19. The contents broadcasting system according to claim 16, wherein the fruition authorization verifier is adapted to perform said second check by comparing the fruition enabling data received from the receiving equipment to fruition-enabling data stored at the contents broadcaster.

20. The contents broadcasting system according to claim 14, wherein said fruition authorization verifier is adapted to communicate with the receiving equipment exploiting an SMS messaging service of the mobile telephony network.

\* \* \* \* \*